March 5, 1929.  D. E. GAMBLE  1,704,503
CLUTCH PLATE
Filed Nov. 30, 1927   2 Sheets-Sheet 1
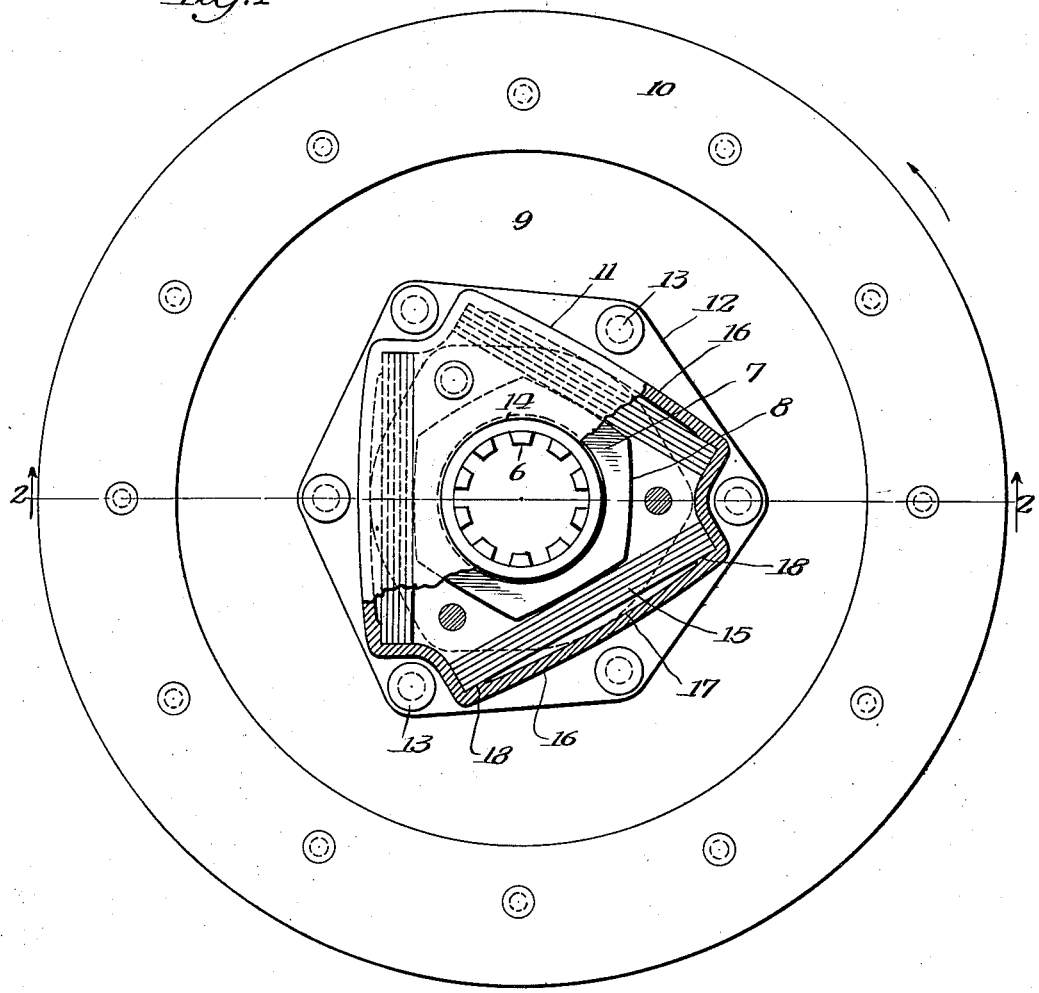
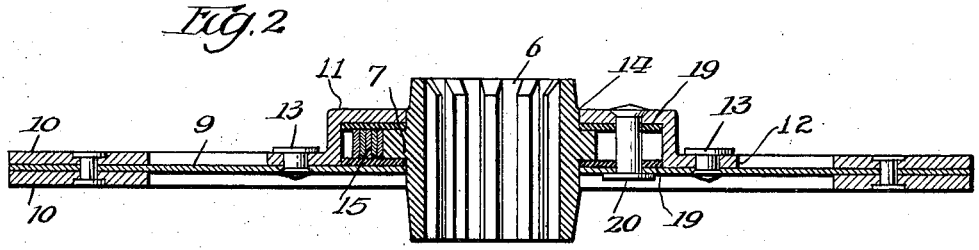
Inventor:
David E. Gamble
By Wm. O. Bell Atty.

March 5, 1929.  D. E. GAMBLE  1,704,503
CLUTCH PLATE
Filed Nov. 30, 1927   2 Sheets-Sheet 2
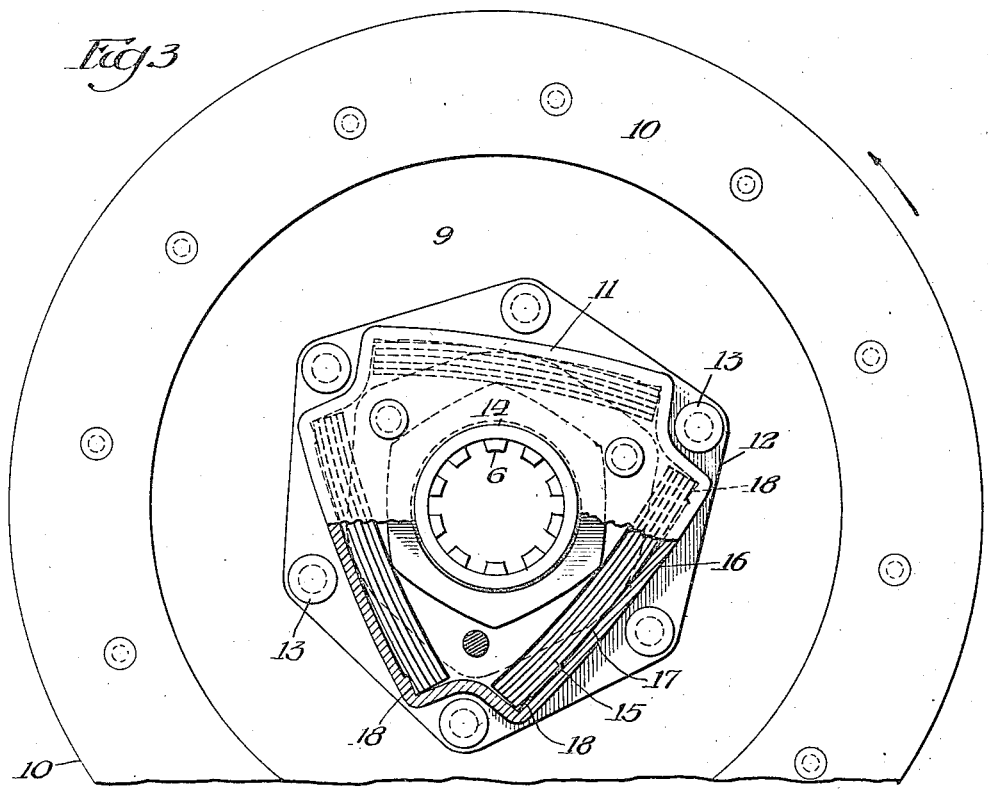
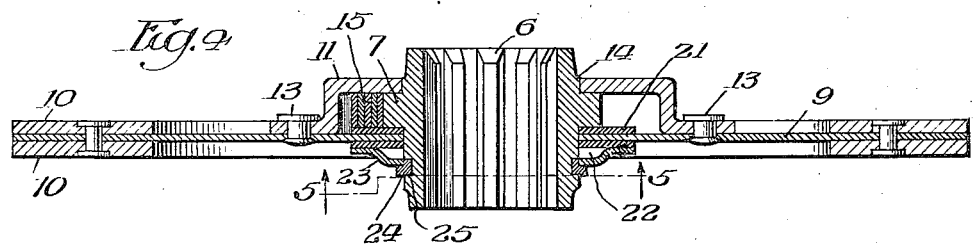
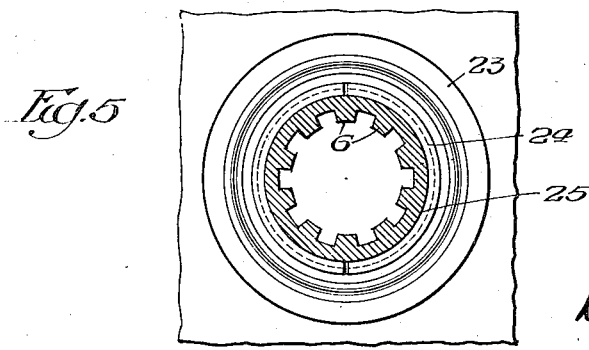
Inventor
David E. Gamble
By Wm. O. Belt
Atty.

Patented Mar. 5, 1929.

1,704,503

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH PLATE.

Application filed November 30, 1927. Serial No. 236,610.

This invention relates to friction clutches of the kind wherein a friction plate driven member is interposed between two parts of a driving member and is adapted to be gripped or clamped by the parts under sufficient pressure to impart motion from the driving member to the driven member.

The object of the invention is to provide a driven plate of novel construction which will absorb the vibrations of the engine and cause the power to flow in a smooth stream from the clutch.

A further object of the invention is to interpose a cushion of novel construction in a friction clutch to dampen the vibrations from the engine and to cushion the blow of sudden clutch engagement.

In the accompanying drawings illustrating selected embodiments of the invention:

Fig. 1 is an elevation of the driven plate partly broken away and in section.

Fig. 2 is a sectional view on the line 2—2 of Fig. 1.

Fig. 3 is a view similar to Fig. 1 showing the parts as they appear while in operation.

Fig. 4 is a sectional view similar to Fig. 2, but showing a slightly modified construction.

Fig. 5 is a sectional view on the line 5—5 of Fig. 4.

Referring to the drawings the driven plate comprises a friction member, which is mounted upon a centrally disposed hub member, and a metallic cushion interposed between said members so that movement of the friction member is communicated through the cushion to the hub member and vibrations of the engine from which the friction member is driven are absorbed by the cushion and do not pass to the hub member.

The hub member comprises a hub 6 having an integral flange 7 which is hexagon in shape and has its sides 8 slightly arced.

The friction member comprises a flat plate ring 9 which is mounted loosely on the hub adjacent one side of the flange. Friction facing rings 10 are fastened to the plate ring at and adjacent its periphery and on opposite sides thereof. A housing 11 substantially triangular in shape is provided with a peripheral flange 12 arranged to lie against the plate ring 9 and to which it is secured by rivets 13, or other suitable fastening devices. The housing has a centrally disposed opening 14 to receive the hub and between this opening and the flange 12 the casing is upset to receive the hub flange 7 and to form a spring cushion chamber about the periphery of the hub flange. Three springs 15, each comprising a plurality of spring leaves arranged one upon the other are disposed within the housing and between the hexagon hub flange and the walls 16 of the housing. The housing is adapted to provide, in effect, three spring chambers or pockets bounded on the outside by the walls 16 and these walls are slightly arced at their inner faces 17. In normal position at rest the sides of the hexagon hub flange engage the springs, and when the movement is first imparted to the friction member, it revolves relatively to the hub member, the springs riding on the corners or high points of the hub flange until the parts have reached the limit of their relative movement whereupon the hub member travels with the friction member. Shoulders 18 are provided on the inner face of the walls 16, to support the springs in normal position when they are not flexed, as shown in Fig. 1, and these shoulders are of such height and the arc of the inner face 17 is such that the springs may be flexed to a point where the springs may travel almost over the corners of the hub flange, but not quite, as shown in Fig. 3. The walls 16 thus constitute stops to limit the flexure of the springs before the springs may travel over the corners of the hub flange; and while the flexure of the springs appears to be comparatively slight, it is sufficient to enable the friction member to travel a considerable distance relative to the hub member to cushion the blow of sudden clutch engagement. These springs constitute a cushion in the clutch plate which absorbs the vibrations and the noises thereof which might otherwise travel from the engine through the clutch.

One or two friction washers 19 may be arranged between the hub flange and the friction member, as shown in Fig. 2, in which one washer is arranged between the hub flange and the housing and the other washer is arranged between the hub flange and the plate. Rivets or bolts 20 may be used to secure the washers to the housing and the plate.

In Figs. 4 and 5 I have shown a friction washer 21 between the hub flange and the plate and another friction washer 22 held against the outer face of the plate by a spring cup washer 23 secured by a lock ring 24 made in two parts which are pressed into a seat 25 in the hub and snap into place.

The friction washers will be provided if additional friction is required to that furnished by the springs and hexagon flange and either form may be used in connection with the springs whenever required.

The friction member and the hub member are maintained in proper concentric relation and the springs uniformly distribute the power exerted by the friction member upon the hub member. The space formed by the arc of each wall 16 between said wall and the spring, Fig. 1, is less than the height of the corners on the hexagon flange or, considering this hexagon flange as a cam, the arced inner face of the wall of the spring chamber restricts the spring deflection to less than the total lift of the cam to confine the deflection of the spring within safe limits and to provide a positive drive in the case of a shock load.

My invention is simple in construction, it can be manufactured comparatively easily and economically and it dampens torsional vibration as well as obtaining a smooth engagement of the clutch.

I have shown the invention in forms which I consider commercially desirable, but I do not confine myself to the particular construction, arrangement and proportion of parts, but reserve the right to make all changes which fairly fall within the scope of the following claim.

I claim:

A driven plate for friction clutches comprising a hub member, a friction member, said friction member having a housing provided with three spring chambers arranged end to end and spaced apart in substantially triangular formation, leaf springs seated in said chambers, and a hexagon flange on said hub member to operatively engage said springs.

DAVID E. GAMBLE.